INVENTOR.
Herbert W. Peters

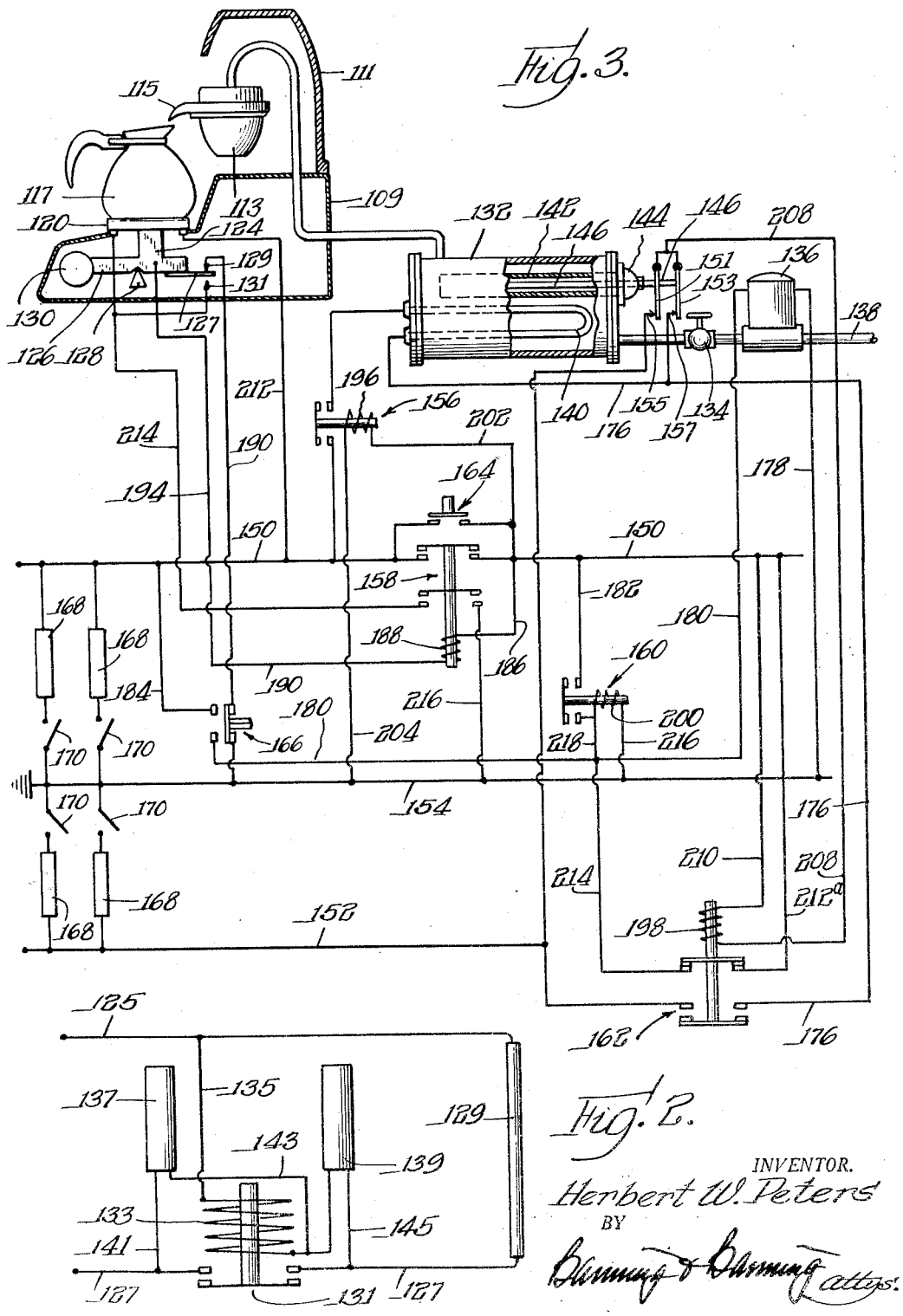

Patented July 17, 1951

2,561,134

UNITED STATES PATENT OFFICE 2,561,134

WATER-HEATING APPARATUS AND CONTROL CIRCUIT FOR USE IN A BEVERAGE BREWING SYSTEM

Herbert W. Peters, Milwaukee, Wis., assignor to Cory Corporation, Chicago, Ill., a corporation of Delaware Application June 9, 1948, Serial No. 32,003

9 Claims. (Cl. 219—39)

This invention, which relates generally to a water heating system or the like, has to do more particularly with certain improvements in a commercial beverage brewer of the type wherein hot water is forced through a refillable cartridge containing a charge of ground coffee bean, and thence into a decanter or other receptacle, and wherein the hot water is supplied from a small built-in water heater usually in connection with a larger water system.

In the operation of such equipment it is desirable, on the one hand, to avoid excessive delays in the production of hot water when additional beverage is needed, as during restaurant rush hours; and, on the other hand, it is important to minimize current consumption. For the purpose of keeping the water in the water heater at a stand-by temperature most appropriate for brewing coffee, it has been the practice, heretofore, to provide the water heater with an auxiliary electric heater element, in addition to the main heater element, which latter is turned on only when coffee is being brewed. The auxiliary heater element is fully justified in establishments where the demand for coffee is large and continuous throughout long periods; but in other establishments the electric current consumption of the auxiliary element is not warranted, while yet it would be a serious handicap to be compelled to wait several minutes for water to heat each time coffee is to be made during rush hours, or to give attention to a thermometer in order to determine when the water is hot enough to start the brewing operation.

Another objection to the auxiliary heater element lies in the fact that it is difficult of manufacture within the close tolerance of resistance needed in order to maintain the water at a standby temperature which is neither too high nor too low; and a good deal of dissatisfaction also has been encountered in certain instances due to the equipment being so situated that the temperature outside the water heater has adversely affected the stand-by temperature of the water, notwithstanding the auxiliary heater element.

One of the immediate objects of the present invention is to provide a beverage brewer of the above-indicated type in which the auxiliary water heater element is eliminated, but which will adequately meet the needs of a large percentage of eating establishments in that little or no delay need ensue in the brewing of coffee or other beverage during rush hours, and only inconsequential delays during the non-rush hours.

Another object of this invention is to provide a water heating system which is particularly well adapted for use in beverage brewers of the above-indicated type, and in which the water will start flowing only when it has reached a predetermined proper temperature, thus making it unnecessary for the attendant to ascertain the water temperature before setting the apparatus into operation, and also unnecessary to allow the water to run through the apparatus prior to the brewing operation in order to get it up to the required temperature.

A further object is to provide a thermostatic control of the slow break type which is operative to maintain temperatures within a very narrow range without causing the controlled relay or electromagnet to flutter.

Still another object is to provide in a beverage brewer of the above-indicated character, between the hot water supply conduit and the refillable cartridge, an improved hydraulic contact coupling which will avoid drippage when the cartridge is removed and which will not require the use of a drip-preventing valve.

These and other objects of my invention will be more fully set forth in the following specification taken in conjunction with the accompanying drawings, wherein like reference numerals refer to like parts throughout.

In the drawings:

Fig. 2 is a circuit diagram of a thermostatic control employing two slow-break thermostats jointly controlling an electromagnetically actuated switch in a manner to avoid fluttering action thereof; and Fig. 3 is a circuit diagram depicting a modification of Fig. 1, wherein there has been incorporated a thermostatic control in accordance with Fig. 2.

Figure 1:
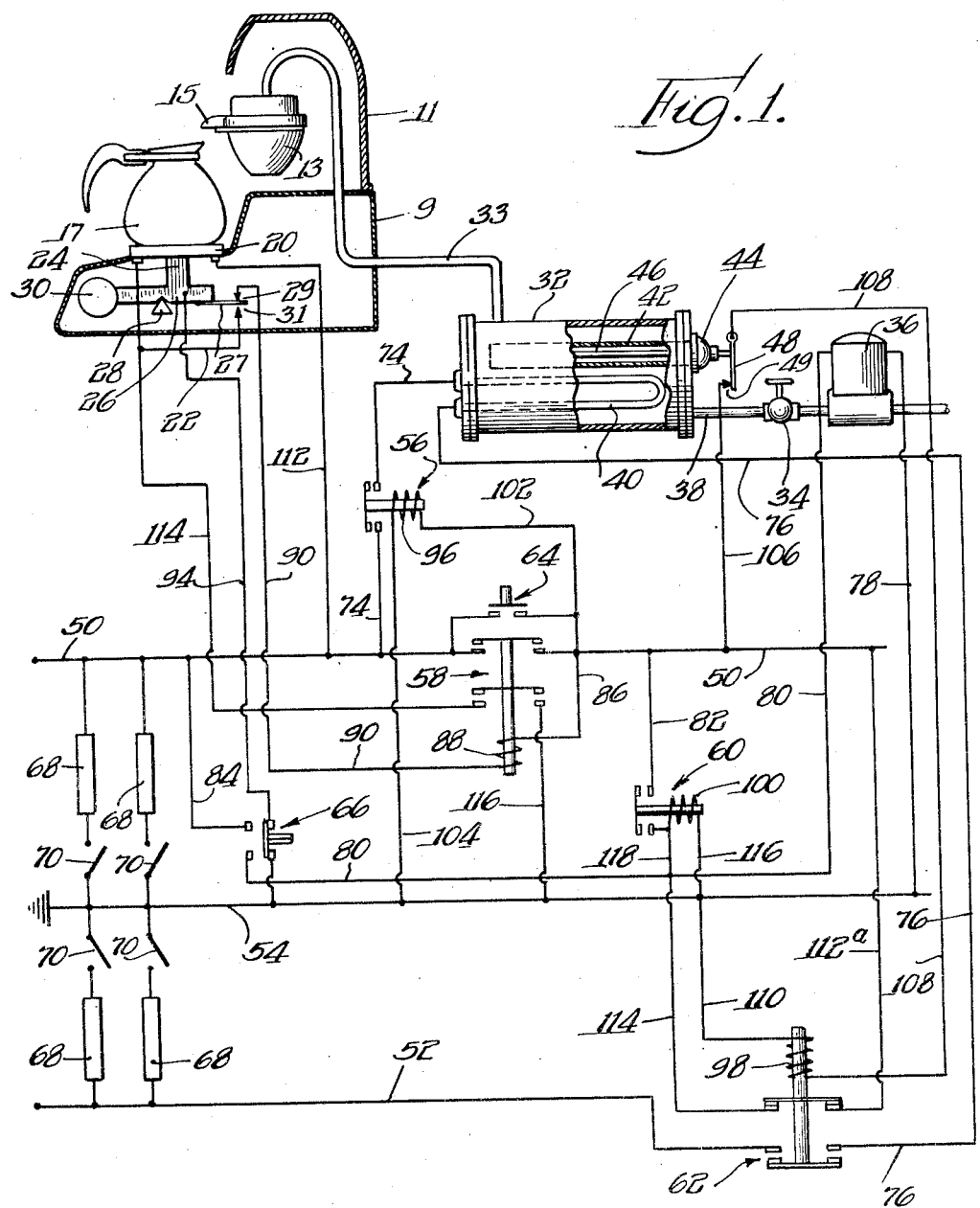
Figure 1 is a circuit diagram illustrating a preferred embodiment of the invention as applied to a beverage brewer.

In the diagrammatic showing of Fig. 1 there have been included the major components of a coffee brewer of the automatic type, and it is to be understood that in ordinary practice the various components are all incorporated in a single self-contained unitary structure, although it is not at all essential, so far as the present invention is concerned, that the ordinary practice be followed.

The structure per se, as distinguished from the electrical circuits and switching equipment, comprises a sheet metal chassis 9 on which is mounted a head 11 which serves as a support for a refillable cartridge 13 in which is contained a charge of ground coffee bean, and through which hot water is passed in the course of the coffee making operation. The cartridge includes a spout 15 from which hot coffee flows into a decanter 17 resting on a platform 20 in which is incorporated an electric heating element (not shown). The platform 20 is supported through the medium of an upright 24 upon one arm of a scale beam 26, which, in turn, is pivotally mounted on a fixed fulcrum 28, the other arm of said beam being provided with a weight 30 which may be adjustably movable along the scale beam.

Incorporated within the chassis 9, but here shown separately and externally thereof for the sake of clarity, are a water heater tank 32, a manually operable shut off valve 34, and a normally closed electromagnetically operated solenoid valve 36. The two valves are connected in series in a water supply pipe 38 which is connected to the water heater tank. Mounted within the water heater tank 32 are an electric heater element 40 and the tube 42 of a thermostat 44 of the familiar rod-and-tube type. A contact arm 27 attached to one end of scale beam 26 and movable therewith is arranged to alternate between upper and lower fixed contacts at 29 and 31 respectively. The rod 46 forming part of the thermostat 44 is arranged to actuate a pivoted contact arm 48 which serves to open and close a contact at 49 in response to changes in the temperature of the water in the tank 32.

In operation, the cartridge 13 is filled with a quantity of ground coffee bean or other beverage-making material, held in place by a removable foraminous cover (not shown) which functions as a filter. Hot water from the heater 32 passes by way of a conduit 33 through the mass of ground coffee bean and thence via the spout 15 into the decanter 17. When the decanter is filled to a predetermined level its weight is sufficient to tilt the scale beam 26 thereby moving the switch arm 27 out of engagement with its upper contact 29 and into engagement with the lower contact 31. The result of this movement of the scale beam is to de-energize the electromagnetically operated valve 36, thereby shutting off the flow of water, while at the same time opening the circuit connecting with the heater element 40.

In addition to the components heretofore mentioned, there are several strictly electrical elements which function to automatically control the operation of the brewer, and these may be supplied with energizing current from a 3-wire, 220-volt, single phase line comprising conductors 50, 52 and 54, the latter of which is a grounded neutral wire; and said elements include: solenoid-operated switches 56, 58, 60 and 62, manually operated pushbutton switches 64 and 66, and four heater elements 68, together with four manually operable switches 70, which are individual to the heater elements 68. The latter are the heater elements of hot plates employed to keep hot a corresponding number of decanters full of liquid coffee or other beverage. They do not form essential parts of the present invention, but have been included in the diagram in order to make the showing complete.

The contact 49 of the thermostatic switch is shown closed, which is the condition obtaining when the temperature of the water in the heater 32 is below a certain predetermined value suitable for brewing coffee or other beverage, as the case may be. When the water temperature has risen to that value the contact 49 is opened.

The heater element 40 is included in a 220 volt circuit extending from the line conductor 50 to the line conductor 52 and embracing conductors 74 and 76, the contacts of the solenoid switch 56 and the lower contacts of the heater-control solenoid switch 62. It will be observed that the heater circuit is open at both said switches, notwithstanding the fact that the thermostat contact 49 is closed.

The solenoid valve 36 is included in a 110 volt circuit extending from the neutral line conductor 54 to the line conductor 50 via the conductors 78 and 80, and thence by way of the contacts of the valve-control solenoid switch 60 and the conductor 82 or, alternatively, by way of the back contacts of the switch 66 and the conductor 84. It will be seen that the circuit of the valve 36 is open at both switches and is, accordingly, de-energized; this valve, therefore, is then closed and water cannot flow into or out of the heater 32.

After placing an empty decanter on the platform 20, operation is started by depressing the switch button 64. This closes a circuit from the line conductor 50 through the conductor 86, the winding 88 of the master control solenoid switch 58, the conductor 90, the switch arm 27 and its upper contact 29, the conductor 94 and the front contacts of the switch 66 to the neutral conductor 54. The master control switch 58 thereupon closes its contacts, the uppers ones of which are in parallel to the contacts of the switch 64.

Simultaneously with closing the circuit of the winding 88 of the master control switch 58, there is also closed the circuit of the winding 96 of the switch 56, and a circuit which includes the winding 98 of the heater-control solenoid switch 62 and the circuit of a heater element incorporated in the platform 20, the purpose of which is to keep the decanter 17 hot while being filled, and thereafter until removed.

The circuit for the winding 96 of the switch 56 extends from the line conductor 50 through the contacts of the switch 64 and includes the conductors 102 and 104, which latter is connected to the neutral conductor 54. As soon as the switch 58 is actuated, its upper contacts are closed in shunt to the pushbutton switch 64, wherefore the latter need be held closed only momentarily.

The circuit of the winding 98 of the heater-control switch 62 extends from the line conductor 50 through the conductor 106, the contact 49 of the thermostat switch, the conductor 108 to the winding 98, and the conductor 110 to the neutral conductor 54. The circuit for the heater element in the platform 20 extends from the line conductor 50 through the conductor 112 to said element, and thence through the conductor 114 to the lower contacts of the solenoid switch 58 and the conductor 116 to the neutral conductor 54.

Energization of the heater-control switch 62 opens its upper contacts and closes its lower contacts. Opening the upper contacts of the switch 62 prevents energization of the winding 100 of the valve-control switch 60 for more than an instant—which is not sufficient to be of any effect; and closure of the lower contacts of the switch 62 completes the previously described circuit of the heater element 40. At this point it will be observed that although the heater element is energized, water is not flowing into or out of the heater tank 32 because the valve 36 is closed, its circuit being broken at the contacts of the heater-control switch 60 and also at the back contacts of the pushbutton switch 66. It is one of the features of this invention that the flow of water will not start until the water temperature has reached a predetermined value.

When the water temperature has reached this value, the thermostat opens its contact 49 thereby breaking the circuit of the winding 98 of the heater-control switch 62, which thereupon opens its lower contacts, breaking the heater circuit, and closes its upper contacts, thereby completing a circuit through the winding 100 of the valve-control switch 60. The latter circuit extends from the line conductor 50 through the conductor 112a, the upper contacts of the switch 62, the conductor 114 through the winding 100, and thence to the neutral conductor 54 via the conductor 116. Energization of the valve-control switch 60 closes its contacts and completes a circuit through the winding of the valve 36, thereby opening said valve and starting the flow of cold water into the heater 32 and a resultant flow of hot water out of the heater via the conduit 33 from which it passes through the mass of ground coffee bean, and thence, as hot coffee, into the decanter 17. The circuit of the valve 36 extends from the line conductor 50 through the conductor 82 and the contacts of the valve-control switch 60, the conductor 118, the conductor 80, the winding of the valve electromagnet, and the conductor 78 to the neutral line conductor 54.

Closure of the contacts of the valve-control switch 60 establishes a holding circuit for that switch, so that even though the contact 49 may close, due to falling water temperature, thereby causing energization of the heater-control switch 62 and a consequent opening of its upper contacts, the circuit of the valve magnet will remain energized, thus preventing interruption of the water flow. This constitutes another feature of the invention.

The holding circuit for the winding 100 of the switch 60 extends from the line conductor 50 through the conductor 82, the contacts of the switch 60, the winding 100 and the conductor 116 to the neutral line conductor 54.

When the decanter 17 is filled to the predetermined level, it will overbalance the weight 30 and cause the switch arm 27 to open its upper contact 29 and close its lower contact 31. The opening of the contact 29 breaks the circuit of the winding 88 of the master control switch 58, thus opening both its upper and lower contacts; and the closure of the contact 31 completes an alternate circuit for the heater element in the platform 20, thereby keeping the decanter 17 hot as long as it is allowed to remain on the platform. This alternate circuit extends from the line conductor 50 through the conductor 112, thence through the heater element in the platform 20, the conductor 22, the contact 31, the switch arm 27, the conductor 94 and the front contacts of the pushbutton switch 66 to the neutral line conductor 54. The latter circuit is broken at the contact 31 when the decanter is removed, and the previously described heater circuit through the lower contacts of the switch 58 is broken as a result of the de-energization of that switch. Hence, there is no heater current consumption at the platform 20 when there is no decanter thereon, and the same is true when there is an empty decanter on the platform and the starter button 64 has not been depressed.

The de-energization of the master control switch 58 also opens its upper contacts, thereby breaking the circuits of the solenoid switches 56, 60 and 62. The circuit of the heater element 40 is thus broken at the contacts of the switch 56 and also at the lower contacts of the switch 62; and the circuit of the valve 36 is broken at the contacts of the valve-control switch 60. The whole system, therefore, is restored automatically to its normal non-operating condition each time a decanter is filled, and it will remain in that condition indefinitely or until the starter pushbutton is again depressed.

Preferably, the heater element 40 has a high wattage rating and high thermal capacity so that not only will it heat the water quickly but will retain enough heat after each operation to maintain the water a long time at a temperature such that it can very quickly be brought up to brewing temperature. When starting up in the morning, with cold water in the water heater, a few minutes may be required to heat the water sufficiently to start the flow of coffee, but thereafter, throughout the day, in most instances, the demand for coffee will be enough to prevent the water getting cold, and the delay involved in bringing the water to brewing temperature is then only a matter of seconds. Of course, in those eating places which have long periods of inactivity between meals the water heater may get cold, but the consequent delay in obtaining fresh hot coffee is more than offset by the reduced current consumption arising from the absence of an auxiliary heater element in the water heater.

The function of the pushbutton switch 66 is to open the valve 36 without energizing the heater element 40 or the heater element in the platform 20, whenever it may be necessary or desirable to flush out the system with cold water. It will be observed that closure of the back contacts of the pushbutton switch 66 completes a circuit extending from the line conductor 50 through the conductors 84 and 80, the winding of the electromagnet of the valve 36, and the conductor 78 to the neutral line conductor 54. Also, the opening of the front contacts of the switch 66 acts to break the circuit of the heater element in the platform 20.

If, when pressing the starter button 64 to initiate a brewing operation, the thermostat contact 49 is open, the upper contacts of the heater-control switch 62 will be closed and a circuit will be established through the winding 100 of the valve-control switch 60, which will close its contacts and thus complete the circuit through the winding of the electromagnet of the valve 36; in consequence, the water will start flowing at once.

The diagram of Fig. 2 illustrates a simplified application of an improvement in thermostatic controls which is characterized by the avoidance of flutter of the controlled electromagnet or relay; and Fig. 3 illustrates how the improvement may be applied as a modification of the system of Fig. 1.

"Flutter" is an appropriately descriptive term which I employ to characterize the behavior of an electromagnet or relay operating under the control of a slow-break thermostat. Because a thermostat of that type does not include a snap-action element it opens and closes its contacts slowly instead of abruptly; and due, probably, to ionization of the gap when a break occurs, there frequently is a period of substantial duration coincident with each contact opening when the controlled electromagnet or relay is alternately energized and de-energized, wherefore it pulls up and releases its armature more or less erratically and repeatedly until the break at the thermostat contact is definitely complete.

The reason for electing to use slow-break thermostats instead of snap-action thermostats is that, with the slow-break type, control of the temperature can be maintained within a much narrower range. It is not practicable, although hypothetically possible, to construct a snap-action thermostatic control which will go on and off within a temperature range of the order of two or three degrees, although it is entirely practicable to do so with a slow-break thermostat. The fluttering operation of the controlled electromagnet, often incidental to the use of a thermostat of the slow-break type, is definitely objectionable, and is obviated by the means herein disclosed.

In Fig. 2 there are shown the two conductors 125 and 127 of an electrical supply line across which is connected an electrical heater element 129. Included in the conductor 127 is a solenoid-operated switch 131 having a winding 133, one terminal of which is connected to the conductor 125 through a conductor 135. Two slow-break thermostats 137 and 139 have their contacts (not shown) connected in series across the terminals of the switch 131 via the conductors 141, 143 and 145. The other terminal of the winding 133 is connected to the common terminal of the two thermostat contacts via the conductor 143.

Let it be assumed that the thermostat 137 is adjusted to close its contact at 195° F., as the temperature decreases, and to break its contact at 196° F., as the temperature rises, and that the thermostat 139 is adjusted to close its contact at 197° F., as the temperature decreases, and to break its contact at 198° F., as the temperature rises. Assume also that the thermostats are subjected to the temperature of a body of water in which is submerged the heater element 129, and that the temperature of the water is something less than 195° F. when the current is turned on.

The contacts of both thermostats will be closed, since they are adjusted to close at 195° F. and 197° F. respectively, and current will flow through the winding 133 via the conductors 141, 143, 135 and the contacts of the thermostat 137. The switch 131 thereupon closes its contacts, completing a circuit to the heater element 129 in shunt to the thermostat contacts.

When the temperature of the water reaches 196° F. the contacts of the thermostat 137 will open, but the winding 133 remains energized through the contacts of the thermostat 139. Hence, no fluttering of the switch 131 will occur as a result of the opening of the contacts of the thermostat 137. When the temperature of the water has reached 198° F., the contacts of the thermostat 139 will open, and at the first break the winding 133 will be de-energized, causing the switch 131 to open. No fluttering of the switch 131 can occur because the opening of its contacts interrupts the current supply to the contacts of the thermostat 139; and the circuit to the winding 133 via the conductors 141 and 143 is already broken by opening of the contacts of the thermostat 137. De-energization of the switch 131 opens the circuit of the heater element 129 and the temperature of the water immediately starts to decline. When it reaches 197° F., the contacts of the thermostat 139 will close, but the winding 133 of the switch 131 will remain de-energized because its contacts are open; when the temperature reaches 195° F., the contacts of the thermostat 137 will close, thereby establishing a circuit through the winding 133 by way of the conductors 135, 141 and 143.

Following energization of the switch 131, if the contacts of the thermostat 137 should flutter, there will be no resultant flutter of the switch 131 because the closure of its contacts establishes a second circuit through the contacts of the thermostat 139 which are firmly closed prior to closure of the contacts of the thermostat 137. It will be seen that such a system is designed to maintain the temperature within a variation of 3° F., or less.

While in Fig. 2 I have shown two separate thermostats 137 and 139, it will be apparent that a single thermostat element can be adapted to actuate the two pairs of thermostat contacts; and I have illustrated in Fig. 3 how that can be done. However, where it is more economical to install two commercial thermostats which can be purchased in the open market than to use a single specially made thermostat having two pairs of contacts, an arrangement such as that of Fig. 2 is advantageous.

Fig. 3 is a duplication of Fig. 1 except for the modifications involved in the substitution therein of a thermostat having two contacts corresponding to the contacts of the two thermostats 137 and 139 of Fig. 2. The parts in Fig. 3 which correspond to those in Fig. 1 are designated by reference numerals of even number having a higher value of 100. The thermostat of Fig. 3 is identified by reference numeral 144, and its rod 146 is arranged to actuate two switch arms 151 and 153 having contacts 155 and 157, respectively. Let us say that the contact 155 corresponds to the contact of the thermostat 137 (Fig. 2) and that the contact 157 corresponds to the contact of the thermostat 139 (Fig. 2), and that the two contacts 155 and 157 are adjusted to make and break at the temperatures previously assumed with reference to the contacts of the thermostats 137 and 139, respectively.

If the temperature of the water in the water heater 132 is below 195° F., both contacts 155 and 157 will be closed; and if the pushbutton of the starter switch 164 is depressed, the switch 162 will be energized to close the circuit of the heater element 140. When the temperature of the water reaches 196° F., the contact 155 will open, but the winding 198 of the switch 162 will remain energized due to the holding circuit through the contact 157 and the lower contacts thereof—said circuit including the conductors 176, 208 and 210, and extending between the line conductors 152 and 150. When the temperature of the water reaches 198° F., the contact 157 will open, thereby de-energizing the winding 198 of the switch 162; and there will be no fluttering of the switch 162 because the circuit through the contact 157 is also open at the lower contacts of the switch 162. Therefore, any momentary reclosure of the contact 157 is without effect on the switch 162.

De-energization of the switch 162 opens the circuit of the heater element 140 at the lower contacts of said switch, and the temperature of the water thereupon decreases. When the temperature has dropped to 197° F., the contact 157 will close, but the winding 198 of the switch 162 will remain de-energized because its circuit is open at its own contacts and at the contact 155. When the temperature reaches 195° F., the contact 155 will close, thereby establishing a circuit through the winding 198, causing the switch 162 to close its lower contacts. If the contact 155 flutters after initial closure, it will not cause the switch 162 to flutter because the closure of the lower contacts of said switch establishes a second circuit through the winding 198 via the contact 157 which was previously closed and is firmly closed by the time the contact 155 closes.

For convenience of illustration, I have shown in Fig. 3 a thermostat 146 having two switch arms 151 and 153, but it will be apparent that a single switch arm with two contact points will accomplish the same purpose. However, the two-switch arm construction generally is preferable because it facilitates the making of adjustments.

It is obvious that various changes may be made in the specific embodiments set forth for purposes of illustration without departing from the principles of the invention. The invention is accordingly not to be limited to the precise details disclosed herein but includes all modifications thereof within the spirit and scope of the appended claims.

I claim:

1. In a water heating system or the like, an electric heater element for heating the water, a thermostat responsive to the temperature of the water, said thermostat including a contact which is closed only when the water is below a predetermined temperature and otherwise open, a normally closed electromagnetically operated valve for controlling the flow of water through the system, an electromagnetically operated heater control switch including a normally open contact in series with said heater element and having its electromagnet winding in series circuit with said thermostat contact, said normally open contact being closed when said winding is energized and thus effective to energize said heater element when said thermostat contact is closed, an electromagnetically operated valve-control switch operative, when energized, to close a circuit through the electromagnet winding of said valve, said heater-control switch having a normally closed contact included in circuit with the electromagnet winding of said valve-control switch, and a master control switch operative to open and close a current supply circuit for the electromagnet windings of said heater-control switch, valve-control switch and valve, the electromagnet of said valve-control switch having a holding circuit in series with said master control switch.

2. In a water heating system or the like, an electric water heating element, a thermostat responsive to the temperature of the water, said thermostat including a contact which is closed only when the water is below a predetermined temperature and otherwise open, a current supply line, an electromagnetically operated master control switch having a normally open contact included in said supply line, an energizing circuit for the electromagnet of said master control switch including a normally closed contact arranged to be opened automatically by weight-responsive means, a manually controlled starter switch for initially closing said energizing circuit, said circuit being held closed through said normally open contact following energization of said electromagnet and until said normally closed contact is opened, an electromagnetically operated heater-control switch having a normally open contact included in a circuit for connecting said heater element to said supply line, the electromagnet of said heater-control switch being connected to said supply line through said thermostat contact, a normally closed electromagnetically operated valve for controlling the flow of water through the system, and an electromagnetically operated valve control switch operative, when energized, to close an energizing circuit through the electromagnet winding of said valve, said heater-control switch having a normally closed contact in series with the electromagnet winding of said valve control switch, and a holding circuit for said valve-control switch for keeping the winding thereof energized notwithstanding a subsequent opening of the normally closed contact of said heater-control switch and until said master control switch is de-energized.

3. In a water heating system or the like including a water heating tank, a water supply pipe connected thereto, an electric heater element for heating the water in said tank, a thermostat responsive to the temperature of the water in said tank and having a contact which is closed only when the water in said tank is below a predetermined temperature, a weight-controlled mechanism adapted to support a receptacle, means for conducting hot water from said tank to a receptacle on said mechanism, a normally closed electromagnetically operated valve included in said water supply pipe, a current supply line, an electromagnetically operated master control switch having a normally open contact in said supply line, a circuit for the winding of the electromagnet of said master control switch for connecting the same to said supply line, said circuit including a normally closed contact adapted to be opened by said weight-controlled mechanism when a receptacle supported thereby has received a predetermined quantity of water, an electromagnetically operated heater-control switch having a normally open contact included in a circuit connecting said heater element to said supply line, a circuit connecting the electromagnet winding of said heater-control switch to said supply line through said thermostat contact, an electromagnetically operated valve-control switch operative, when energized, to connect the electromagnet winding of said valve to said line, said heater-control switch having a normally closed contact included in a circuit connecting the electromagnet winding of said valve-control switch to said supply line, and a holding circuit for the winding of the electromagnet of said valve-control switch, the aforementioned normally open contact of said master control switch being so placed that, when opened, it breaks the current supply to the electromagnet winding of said heater-control switch and to said holding circuit.

4. In a water heating system or the like, a water heating tank, a heater for heating the water in said tank, a thermostat responsive to the temperature of the water in said tank, a valve for controlling the flow of water through said tank, said valve being operative under the control of said thermostat so that it can be opened, following the commencement of a given operation, only after the water has been heated to a predetermined temperature, and means operative thereafter to hold said valve open, independently of said thermostat, until the completion of said given operation, said means being operative to release said valve in response to the completion of said operation.

5. In a water heating system or the like, a water heating tank, a heater for heating the water in said tank, a thermostat responsive to the temperature of the water in said tank, a current supply line, an electrically operated heater-control switch operative, when energized, to close a circuit for activating said heater, an electrically operated valve for controlling the flow of water through said tank, said heater-control switch being under the control of said thermostat so that said heater can be activated only when the water in said tank is below a predetermined temperature, said valve being included in a circuit under the control of said heater-control switch, said circuit being effective to open said valve when said heater-control circuit is de-energized, and a master control switch normally effective to cut off the current supply for energizing said heater-control switch, and means operative to hold said valve open independently of said heater-control switch after said valve has initially been opened, said means being de-actuable in response to an opening of said master control switch.

6. A temperature responsive system comprising a normally open switch, an electromagnet operative, when energized, to close said switch, two pairs of contacts connected in series across the terminals of said switch, thermostatic means for actuating said contacts, and a source of current connected at one side to one terminal of said electromagnet and at the other side to one terminal of said switch, the other terminal of said electromagnet being connected to the common terminal of said two pairs of contacts, one of said pairs of contacts being adjusted to make and break at slightly lower temperatures than the other pair, said thermostatic means being effective to close both said pairs of contacts at their respective make temperatures and to hold both said pairs of contacts closed at all lower temperatures, said thermostatic means being further effective to open both said pairs of contacts at their respective break temperatures and to hold both said pairs of contacts open at all higher temperatures.

7. A temperature responsive system comprising a normally open switch, an electromagnet operative, when energized, to close said switch, two pairs of contacts connected in series across the terminals of said switch, thermostatic means of the slow break type for actuating said contacts, and a source of current connected at one side to one terminal of said electromagnet and at the other side to one terminal of said switch, the other terminal of said electromagnet being connected to the common terminal of said two pairs of contacts, one of said pairs of contacts being adjusted to make and break at slightly lower temperatures than the other pair, said thermostatic means being effective to close both said pairs of contacts at their respective make temperatures and to hold both said pairs of contacts closed at all lower temperatures, said thermostatic means being further effective to open both said pairs of contacts at their respective break temperatures and to hold both said pairs of contacts open at all higher temperatures.

8. A temperature control system comprising an electric heater element, a current supply circuit connected across the terminals of said heater element, a normally open switch included in one side of said circuit in series with said element, an electromagnet operative when energized to close said switch, two pairs of contacts connected in series across the terminals of said switch, one terminal of said electromagnet being connected to the common terminal of said two pairs of contacts, the other terminal of said electromagnet being connected to said current supply circuit at a point of different potential than its first-mentioned terminal, and thermostatic means subjected to heat from said element for actuating said contacts, one of said pairs of contacts being adjusted to make and break at slightly lower temperatures than the other pair, said thermostatic means being effective to close both said pairs of contacts at their respective make temperatures and to hold both said pairs of contacts closed at all lower temperatures, said thermostatic means being further effective to open both said pairs of contacts at their respective break temperatures and to hold both said pairs of contacts open at all higher temperatures.

9. A temperature control system according to claim 8, wherein the thermostatic means is of the slow make and break type.

HERBERT W. PETERS.

REFERENCES CITED

The following references are of record in the file of this patent:

UNITED STATES PATENTS

| Number | Name | Date |
|---|---|---|
| Re. 22,022 | Peters | Feb. 10, 1942 |
| 959,110 | Buck | May 24, 1910 |
| 1,809,899 | Heroy | June 16, 1931 |
| 1,880,524 | Taylor | Oct. 4, 1932 |
| 2,052,396 | Getchell | Aug. 25, 1936 |
| 2,170,310 | Shivers | Aug. 22, 1939 |
| 2,427,444 | Colombo | Sept. 16, 1947 |

OTHER REFERENCES

Abstract No. 614,768 (published in O. G. July 12, 1949, page 637).